(12) United States Patent
Kim et al.

(10) Patent No.: US 10,782,909 B2
(45) Date of Patent: Sep. 22, 2020

(54) DATA STORAGE DEVICE INCLUDING SHARED MEMORY AREA AND DEDICATED MEMORY AREA

(71) Applicant: Samsung Electronics Co., Ltd., Suwon-si, Gyeonggi-do (KR)

(72) Inventors: Jong Hwa Kim, Suwon-si (KR); Sehwan Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 25 days.

(21) Appl. No.: 15/984,611

(22) Filed: May 21, 2018

(65) Prior Publication Data

US 2019/0121567 A1 Apr. 25, 2019

(30) Foreign Application Priority Data

Oct. 23, 2017 (KR) .................. 10-2017-0137357

(51) Int. Cl.
*G06F 3/06* (2006.01)

(52) U.S. Cl.
CPC .......... *G06F 3/0647* (2013.01); *G06F 3/0604* (2013.01); *G06F 3/064* (2013.01); *G06F 3/0616* (2013.01); *G06F 3/0625* (2013.01); *G06F 3/0644* (2013.01); *G06F 3/0656* (2013.01); *G06F 3/0679* (2013.01); *G06F 3/0688* (2013.01)

(58) Field of Classification Search
CPC .... G06F 3/0679; G06F 3/0688; G06F 3/0616; G06F 3/0647; G06F 3/0656; G06F 3/0604; G06F 3/064; G06F 3/0644; G06F 3/0625

USPC .......................................................... 711/147
See application file for complete search history.

(56) References Cited

U.S. PATENT DOCUMENTS

| | | | |
|---|---|---|---|
| 5,572,645 A | 11/1996 | Dan et al. | |
| 7,418,001 B2 | 8/2008 | Yun et al. | |
| 7,752,362 B2 | 7/2010 | Nishimoto et al. | |
| 8,601,347 B1 * | 12/2013 | Koseki | G06F 11/1048 714/758 |
| 8,738,572 B2 | 5/2014 | Bird et al. | |
| 8,949,568 B2 | 2/2015 | Wei et al. | |

(Continued)

FOREIGN PATENT DOCUMENTS

JP 2005-020609 A 1/2005

*Primary Examiner* — Hashem Farrokh
(74) *Attorney, Agent, or Firm* — Harness, Dickey & Pierce, P.L.C.

(57) ABSTRACT

The data storage device including a buffer configured to receive first information including first data and a first stream class number identifying characteristics of the first data and second information including second data and a second stream class number identifying characteristics of the second data and store the first and second information therein, the second stream class number being different from the first stream class number, a non-volatile memory including a shared memory area and a dedicated memory area different from the shared memory area and configured to store the first and second data stored in the buffer, the non-volatile memory, and a controller configured to control the buffer and the non-volatile memory, the controller configured to store the first and second data stored in the shared memory area, and then migrate the first data stored in the shared memory area to the dedicated memory area may be provided.

17 Claims, 15 Drawing Sheets

(56) References Cited

U.S. PATENT DOCUMENTS

| | | |
|---|---|---|
| 9,632,927 B2 | 4/2017 | Camp et al. |
| 2003/0163618 A1 | 8/2003 | Anand et al. |
| 2013/0024609 A1* | 1/2013 | Gorobets ............ G06F 12/0246 711/103 |
| 2014/0025864 A1* | 1/2014 | Zhang ................ G06F 12/0246 711/103 |
| 2015/0074337 A1 | 3/2015 | Jo et al. |
| 2015/0227418 A1* | 8/2015 | Cai .................... G06F 11/1048 714/768 |
| 2016/0283125 A1 | 9/2016 | Hashimoto et al. |
| 2017/0031631 A1 | 2/2017 | Lee et al. |
| 2017/0060479 A1 | 3/2017 | Hong et al. |
| 2017/0153848 A1* | 6/2017 | Martineau ............... G06F 3/061 |
| 2017/0168929 A1* | 6/2017 | Kanno .................. G06F 3/0616 |
| 2017/0185298 A1 | 6/2017 | Camp et al. |
| 2018/0024920 A1* | 1/2018 | Thomas .............. G06F 12/0246 711/103 |

\* cited by examiner

140

DATA STORAGE DEVICE INCLUDING SHARED MEMORY AREA AND DEDICATED MEMORY AREA

This application claims priority under 35 U.S.C. § 119 to Korean Patent Application No. 10-2017-0137357, filed on Oct. 23, 2017, in the Korean Intellectual Property Office, the disclosure of which is incorporated herein by reference in its entirety.

BACKGROUND

1. Field

The present inventive concepts relate to a data storage device including a shared memory area and a dedicated memory area.

2. Description of the Related Art

Demands for data storage devices, for example, NAND-based drives, are gradually increasing due to their high performance and low power consumption. Because NAND-based drives do not allow overwriting, copying user data to new data storage blocks and erasing invalid data storage blocks, known as garbage collection, can be used.

Garbage collection can reduce both read and write performances of NAND-based drives. However, garbage collection can increase write amplification because data write requests can cause several internal writes to a media (e.g., NAND-based drives). Write amplification may occur, for example, when valid data is first read from a storage block of the media that is to be erased, and then rewritten to another storage block of the media, and then new data from a host may be written to the another storage block of the media.

In a host, related or similar data may be classified into the same stream class numbers. Garbage collection can be eliminated or reduced by storing data of the same stream class number in the same erase block or the same drive.

However, if data including various stream class numbers are separately stored into each block, power may be separately consumed and time loss may occur because data is divided and stored in each storage block of the media.

SUMMARY

An aspect of the present inventive concepts is to provide a data storage device in which, when data stored in a buffer is stored in a non-volatile memory, the data is stored in a shared memory area without classifying the stream class numbers included in the data, thereby allocating a memory block for storing only data including an associated stream class number, reducing the power consumption required to distribute and store the data in each memory block, and reducing the write amplification coefficient caused by garbage collection.

Another aspect of the present inventive concepts is to provide a data storage device in which, when data stored in a buffer is stored in a non-volatile memory, data is distributed and stored into one of a shared memory area and a dedicated memory area based on the stream class numbers of the data stored in the buffer, thereby reducing power consumption and reducing the write amplification coefficient caused by garbage collection.

According to an example embodiment of the present inventive concepts, a data storage device includes a buffer configured to receive first information and second information and store the first and second information therein, the first information including first data and a first stream class number identifying characteristics of the first data, the second information including second data and a second stream class number identifying characteristics of the second data, the second stream class number being different from the first stream class number, a non-volatile memory configured to store the first and second data stored in the buffer, the non-volatile memory including a shared memory area and a dedicated memory area, the dedicated memory area being different from the shared memory area, and a controller configured to control the buffer and the non-volatile memory, the controller further configured to store the first and second data stored in the shared memory area, and then migrate the first data stored in the shared memory area to the dedicated memory area. According to an example embodiment of the present inventive concepts, a data storage device includes a buffer configured to receive first information, second information, and third information and store the first, second, and third information therein, the first information including first data and a first stream class number identifying characteristics of the first data, the second information including second data and a second stream class number identifying characteristics of the second data, the second stream class number different from the first stream class number, and the third information including third data and a third stream class number identifying characteristics of the third data, the third stream class number being different from the first and second stream class numbers, a non-volatile memory configured to store the first, second, and third data stored in the buffer, the non-volatile memory including a shared memory area and a dedicated memory area different from the shared memory area, and a controller configured to control the buffer and the non-volatile memory, the controller further configured to store the first and second data and the first and second stream class numbers stored in the buffer in a shared memory area if a storage frequency of each of the first stream class number and the second stream class number is equal to or less than a threshold storage frequency, and store the third data and the third stream class number stored in the buffer in the dedicated memory area if a storage frequency of the third stream class number is greater than the threshold storage frequency.

According to an example embodiment of the present inventive concepts, a data storage device includes a buffer configured to receive first information, second information, and third information, and store the first, second, and third information therein, the first information including first data and a first stream class number identifying characteristics of the first data, the second information including second data and a second stream class number identifying characteristics of the second data, the second stream class number being different from the first stream class number, and the third information including third data and a third stream class number identifying characteristics of the third data, the third stream class number being different from each of the first and second stream class numbers, a non-volatile memory configured to store the first to third data stored in the buffer, the non-volatile memory including a shared memory area and a first dedicated memory block, the shared memory area configured to store the first and second data, and the first dedicated memory block included in a dedicated memory area and configured to store only the third data, and a controller configured to control the buffer and the non-volatile memory.

However, example embodiments of the present inventive concepts are not restricted to the ones set forth herein. The above and other aspects of the present inventive concepts will become more apparent to one of ordinary skill in the art to which the present inventive concepts pertains by referencing the detailed description of some example embodiments given below.

The above and other aspects and features of the present inventive concepts will become more apparent by describing in detail some example embodiments thereof with reference to the drawings.

DETAILED DESCRIPTION

In this disclosure, numbers can be used to distinguish each component (for example, 'first' and 'second'). Elements or components are not limited by terms. These terms are used only to distinguish one element or component from another element or component. For example, the first element or component to be mentioned below may be a second element or component within the technical idea of the present inventive concepts. Further, the first element or component to be mentioned below does not mean just one element or component. For example, the first element or component may include a plurality of elements or components.

Hereinafter, some example embodiments of the present inventive concepts will be described with reference to the attached drawings.

Figure 1:
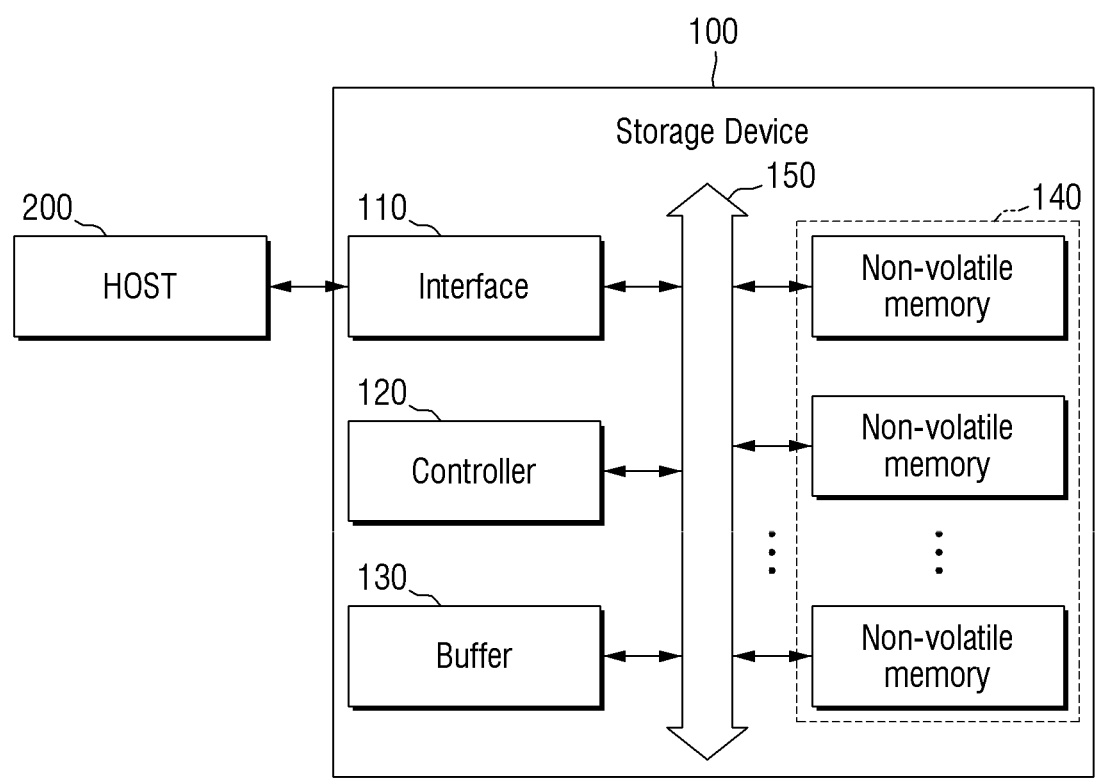
FIG. 1 is a block diagram illustrating a data processing system according to an example embodiment.

FIG. 1 is a block diagram illustrating a data processing system according to an example embodiment.

Referring to FIG. 1, a data processing system includes a storage device 100 and a host 200. Here, each component may be configured as a chip, a module, or a device, and may be included in one device. For example, the storage device 100 may be used in connection with the host 200. However, the present inventive concepts are not limited thereto. In some example embodiments, the storage device 100 and the host 200 may be integrated into one apparatus.

The host 200 makes a request such as reading or writing to the storage device 100 using an application or a file system. For example, the host 200 may transmit a command for instructing the storage device 100 to perform a write operation to the storage device 100. The storage device 100 may transmit the request response included in the command (for example, a response to a write command) to the host 200.

The host 200 may transmit data to the storage device 100. Data may include information about a stream class number identifying the characteristics of the data to be stored. The host 200 may have a directive function. The directive function may be a function of allowing the host 200 to previously determine a stream class number according to the kind and type of data and transmit the determined stream class number to the storage device 100. In some example embodiments, the data received from the host 200 may include the corresponding data as well as the stream class number associated therewith, instead of separately classifying the stream class numbers in the storage device 100.

Data having the same stream class number may be associated with each other or may have a similar lifetime. For example, repeatedly and frequently updated data may have the same stream class number. Because similar types of data may be assumed to have similar lifetimes to each other, data having the same stream class number may have similar lifetimes to each other.

The storage device 100 may control an internal operation (for example, read or write) in response to a request from the host 200.

The storage device 100 may include an interface 110, a controller 120, a buffer 130, and a non-volatile memory 140.

The interface 110 may include a protocol for performing data exchange between the host 200 and the controller 120. For example, the interface 110 may be configured to communicate with the host 200 through at least one of various internal protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a non-volatile memory express (NVMe) protocol, and a query request protocol. The interface 110 may include at least one processor. The processor included in the interface 110 may be a microprocessor, but is not limited thereto.

The controller 120 may control the interface 110, the buffer 130, and the non-volatile memory 140. The controller 120 may exchange commands and data between the host 200 and the nonvolatile memory 140 and between the host 200 and the buffer 130 through the interface 110. Some operations of the data storage device 100 may be performed by the controller 120. The controller 120 may include at least one processor. The processor included in the controller 120 may be a micro-processor, but is not limited thereto. Details will be described with reference to FIG. 2.

Figure 2:
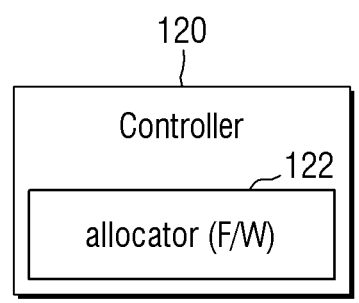
FIG. 2 is a block diagram illustrating a controller of a data storage device according to an example embodiment.

FIG. 2 is a block diagram illustrating a controller of a data storage device according to an example embodiment.

Referring to FIG. 2, the controller 120 may include an allocator 122. The allocator 122 may determine whether to store the data received from the host 200 to a shared memory area (142 of FIG. 3) or a dedicated memory area (144 of FIG. 3), based on the stream class number which is included in the data. First data and second data can be stored in the shared memory area (142 of FIG. 3). The first data may include a first stream class number, and the second data may include a second stream class number which is different from the first stream class number. The dedicated memory area (144 of FIG. 3) may include a dedicated memory block. The dedicated memory block may be assigned to a third stream class number which is different from the first and second stream class number. A third data which includes the third stream class number may be only stored in the dedicated memory area (144 of FIG. 3). Details will be described later.

The allocator 122 may be implemented as firmware (F/W), but is not limited thereto. For example, the allocator 122 may be implemented in software, hardware, or a combination thereof. Those skilled in the art will be able to implement the allocator 122 in a suitable manner.

Referring to FIG. 1 again, the buffer 130 may temporarily store data received from the host 200. The buffer 130 may include a high-speed volatile memory or non-volatile memory. For example, the buffer 130 may be a single level cell (SLC) area of a dynamic random access memory (DRAM), a static random access memory (SRAM), or a flash memory, but the present inventive concepts are not limited thereto.

The non-volatile memory 140 may store data temporarily stored in the buffer 130. For example, the non-volatile memory 140 may be a flash memory including a NAND flash. The flash memory may include a single level cell (SLC) area and a multi-level cell (MLC) area. However, the present inventive concepts are not limited thereto. For example, the non-volatile memory 140 may include a personal computer memory card international association (PCMCIA), compact flash card (CF), smart medial card (SM, SMC), memory stick, multimedia card (MMC, RS-MMC, MMCmicro), SD card (SD, miniSD, microSD, SDHC), universal flash storage (UFS), embedded multimedia card (eMMC), NAND flash memory, NOR flash memory, and V-NADN flash memory. However, the present inventive concepts are not limited thereto. Details will be described with reference to FIG. 3.

Figure 3:
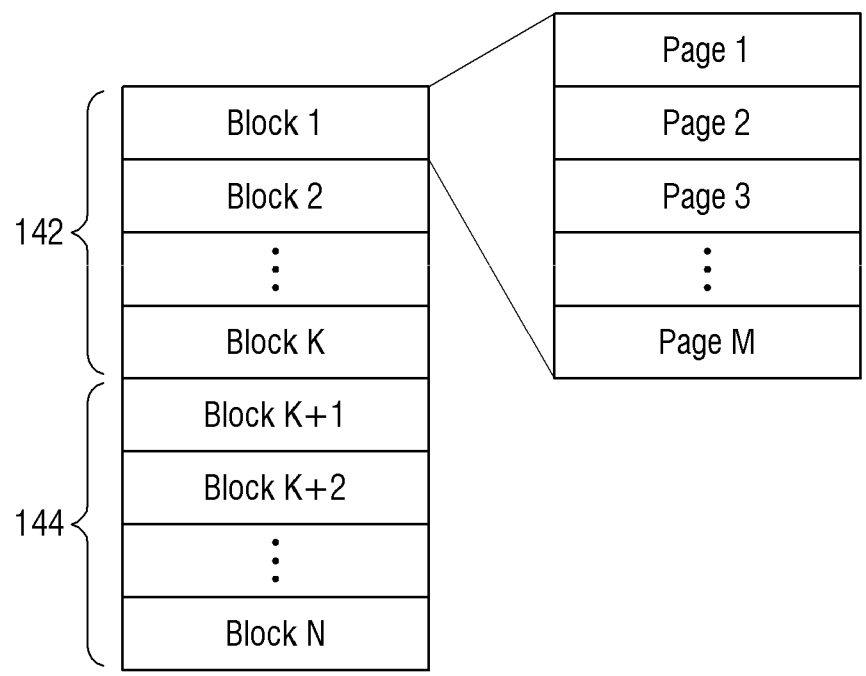
FIG. 3 is a diagram illustrating a non-volatile memory according to an example embodiment.

FIG. 3 is a diagram illustrating a non-volatile memory according to an example embodiment.

Referring to FIG. 3, the non-volatile memory 140 may include a plurality of memory blocks Block1 to BlockN. The non-volatile memory 140 may include a shared memory area 142 Block1 to BlockK and a dedicated memory area 144 BlockK+1 to BlockN.

The shared memory area 142 may include a plurality of shared memory blocks Block1 to BlockK. The shared memory area 142 may store data including various stream class numbers. For example, a plurality of data stored in the buffer 130 may be stored in the shared memory area 142 regardless of the kind of stream class numbers included in each data.

The dedicated memory area 144 may store only data including stream class numbers allocated to the respective dedicated memory blocks BlockK+1 to BlockN. For example, only data including the first stream class number may be stored in the first dedicated memory block BlockK+1, and data including the second stream class number may be stored in the second dedicated memory block BlockK+2. That is, each of the dedicated memory blocks BlockK+1 to BlockN included in the dedicated memory area 144 may store data including only one stream class number. For example, assuming that each of the first and second data includes a first stream class number and the third data includes a second stream class number, the first and second data may be stored in the first dedicated memory block BlockK+1, and the third data may be stored in the second dedicated memory block BlockK+2.

Each of the plurality of memory blocks Block1 to BlockN may include a plurality of pages Page 1 to Page M. A page may be a minimum unit for writing data. In other words, the minimum unit of write operation of the storage device 100 may be a page.

Referring to FIG. 1 again, the storage device 100 includes a data bus 150 that can be used for data communication among the interface 110, the controller 120, the buffer 130, and the non-volatile memory 140. The data bus 150 corresponds to a path through which data is moved, and may include a protocol for performing data exchange.

Figure 4:
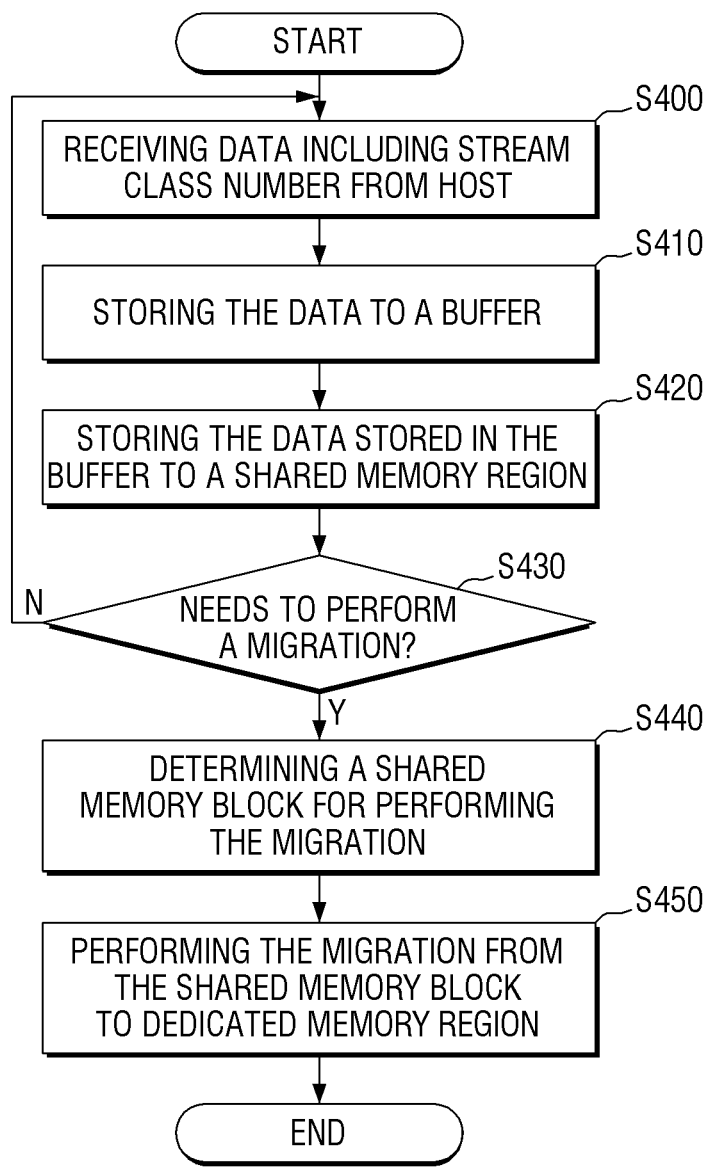
FIG. 4 is a flow chart illustrating the operation of a data storage device according to an example embodiment.

FIG. 4 is a flow chart illustrating the operation of a data storage device according to an example embodiment.

Referring to FIG. 4, the storage device 100 receives data from the host 200. The data may include stream class numbers identifying the characteristics of the corresponding data (S400). Details will be described with reference to FIG. 5.

Figure 5:
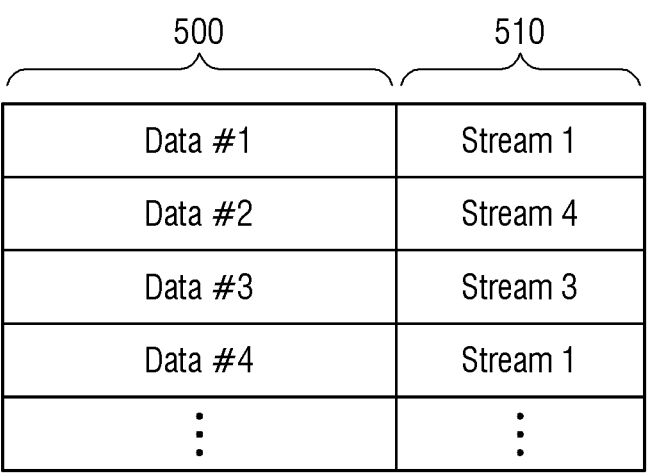
FIG. 5 is a diagram illustrating data received from the host 200 according to an example embodiment.

FIG. 5 is an example diagram illustrating data received from the host 200 according to some embodiments.

Referring to FIG. 5, information (500, 510) received from the host 200 may include data 500 and stream class numbers 510 identifying the characteristics of the data 500. In this disclosure, the stream class numbers 510 may be determined depending on various factors such as the type of the data 500 and/or the update frequency of the data 500. For example, the stream class number identifying the characteristic of first data Data #1 may be first stream class number Stream1. The stream class number identifying the characteristic of second data Data #2 may be forth stream class number Stream4. The stream class number identifying the characteristic of third data Data #3 may be third stream class number Stream3. The stream class number identifying the characteristic of fourth data Data #4 may be first stream class number Stream 1. Here, the first data Data #1 and the fourth data Data #4, which include the first stream class number Stream1, may have the same or similar lifetime. However, the first to fourth data Data #1 to Data #4 and the first stream class number Stream1, the third stream class number Stream3, and the forth stream class number Stream4, shown in FIG. 5, are arbitrarily selected terms for ease of explanation, and the present inventive concepts are not limited thereto. For example, the stream class numbers may be classified into Hot, Warm, and Cold pages.

Although not shown in the drawings, data received from the host 200 may include address information and/or error correction parities (ECC parities) in addition to the data 500 and the stream class numbers 510 identifying the characteristics of the data 500.

Referring to FIG. 4 again, data is temporarily stored in the buffer 130 (S410).

The data stored in the buffer 130 is stored in the shared memory area 142 (S430).

Depending on various circumstances, the data stored in the buffer 130 may be stored in the shared memory area 142. For example, when a flush command is input from the host 200, the data stored in the buffer 130 may be transferred to the shared memory area 142. Further, when there is no more space for storing data in the buffer 130, the data stored in the buffer 130 may be transferred to the shared memory area 142. Still further, the data stored in the buffer 130 may be transferred to the shared memory area 142 during a desired (or alternatively, predetermined) period.

Then, whether to migrate the data stored in the shared memory area 142 is determined (S430). For example, when there is no more space in the shared memory area 142 for storing data from the buffer 130, the data stored in the shared memory area 142 may be migrated. Further, the data stored in the shared memory area 142 may be migrated for each desired (or alternatively, predetermined) period.

If migration of the data stored in the shared memory area 142 is not desired, the above processes are repeated (S400 to S420).

If migration of the data stored in the shared memory area 142 is desired, a shared memory block, which is included in the shared memory area 142, for performing the migration is determined (S440). Details will be described with reference to FIGS. 6A and 6B.

Figure 6A:
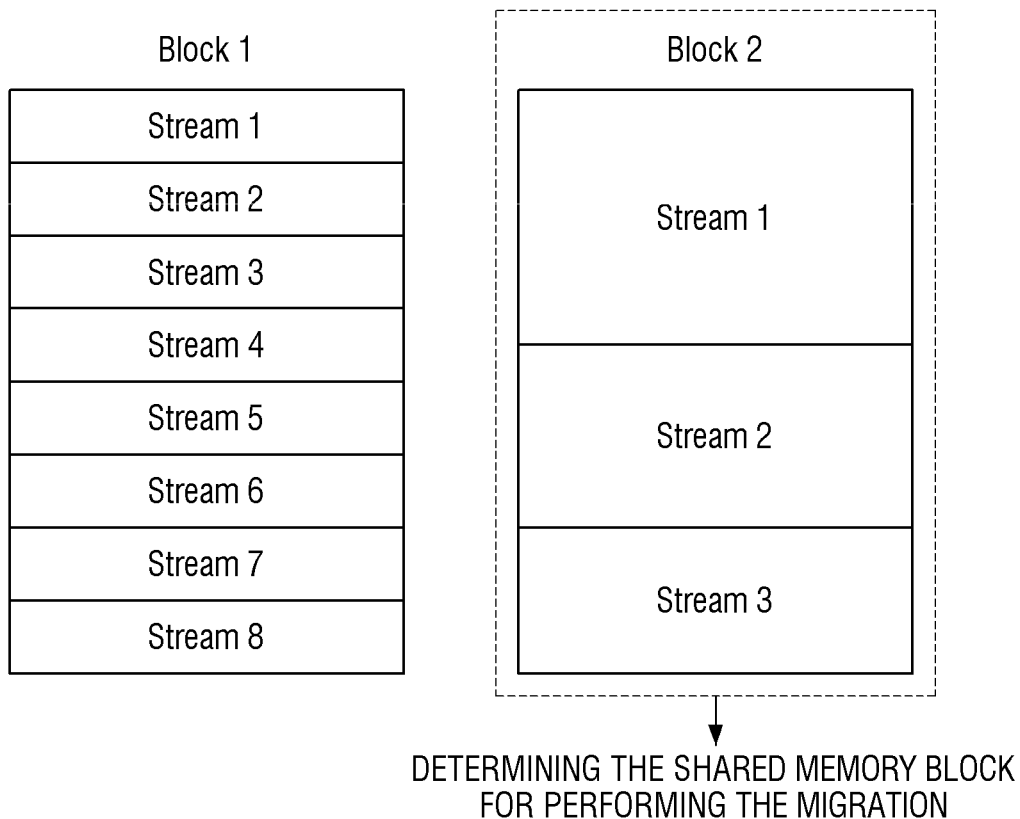
FIGS. 6A and 6B are diagrams for explaining processes of determining a shared memory block for performing the migration from the shared memory area 142 of a data storage device according to some example embodiments.
Figure 6B:
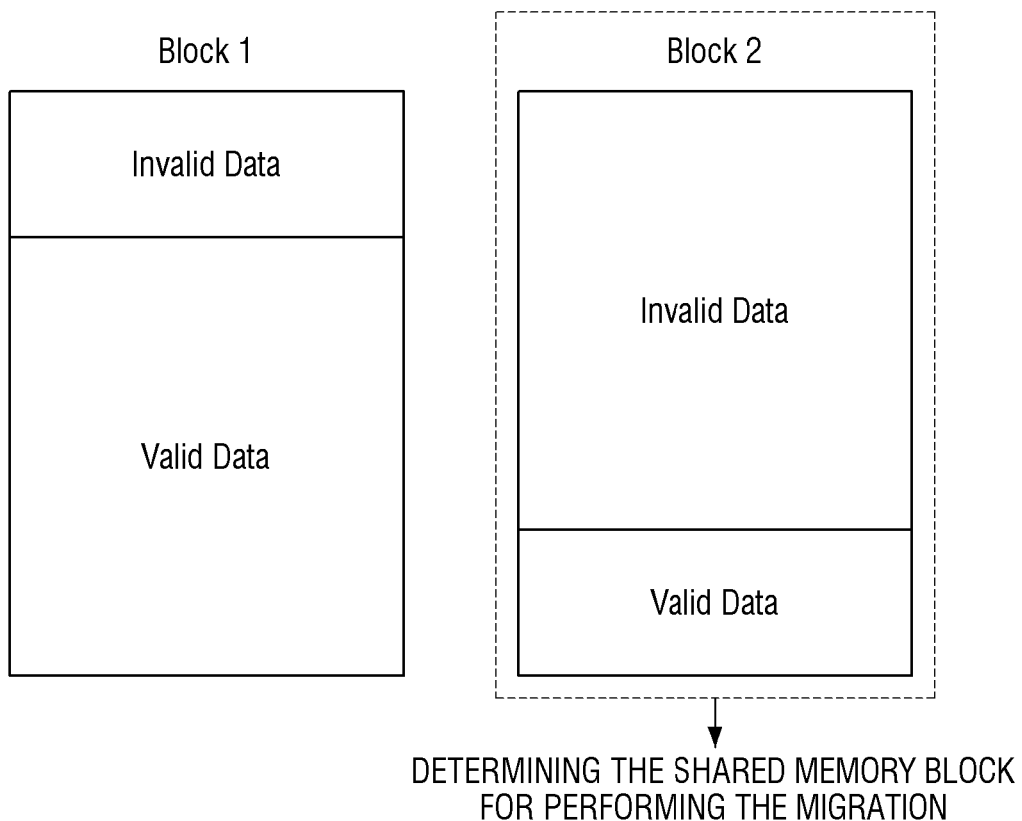

FIGS. 6A and 6B are diagrams for explaining processes of determining a shared memory block for performing the migration from the shared memory area 142 of a data storage device according to some example embodiments.

Referring to FIG. 6A, the shared memory area 142 of the data storage device 100 may include a plurality of shared memory blocks Block1 and Block2. Although FIG. 6A shows that the shared memory area 142 includes only two shared memory blocks Block1 and Block2, this is for convenience of explanation, and the present inventive concepts is not limited thereto.

Further, although FIG. 6A shows that only stream class numbers are stored in the first and second shared memory blocks Block1 and Block2, this is only for convenience of explanation. As described above, the first and second shared memory blocks Block1 and Block2 may store both data and stream class numbers associated with the data, and may also store both address information and/or error correction parities.

According to some example embodiments, between the first and second shared memory blocks Block1 and Block2 included in the shared memory area 142, a shared memory block having a relatively small number from among kinds of stream class numbers, which are stored in the first and second shared memory blocks Block1 and Block2, respectively, may be determined as a block for performing migration. The relative small number may be determined with respect to a threshold number.

For example, the first shared memory block Block1 of the shared memory area 142 may store first stream class number Stream1 to eighth stream class number Stream 8. Thus, the first shared memory block Block1 may store eight kinds of stream class numbers. The second shared memory block Block2 of the shared memory area 142 may store first stream class number Stream1 to third stream class number Stream3. Thus, the second shared memory block Block2 may store three kinds of stream class numbers.

Therefore, between the first shared memory block Block1 and the second shared memory block Block2, the second shared block Block2 may be selected as a block for performing migration.

When a block having the smallest or relatively small number of kinds of stored stream class numbers is selected as a block for performing migration among the plurality of shared memory blocks, a write amplification factor (WAF) can be minimized, and power consumption can be reduced.

Referring to FIG. 6B, the shared memory area 142 of the data storage device 100 may include a plurality of shared memory blocks. For convenience of explanation, contents overlapping those of FIG. 6A will be omitted or briefly described.

In the plurality of shared memory blocks included in the shared memory area 142, a shared memory block having the smallest (or relatively small) number of valid data stored therein may be determined as a block for performing migration.

For example, the area of valid data and the area of invalid data, shown in FIG. 6B, may refer to the ratio of valid data and ratio of invalid data in the data stored in the first shared memory block Block1 and second shared memory block Block2, respectively. For example, the number of valid data in the first shared memory block Block1 may be larger than the number of invalid data in the first shared memory block Block1. Further, the number of valid data in the second shared memory block Block2 may be smaller than the number of invalid data in the second shared memory block Block2. Therefore, if the size of the first shared memory block Block1 is equal to the size of the second shared memory block Block2, the number of valid data in the first shared memory block Block1 may be larger than the number of valid data in the second shared memory block Block2.

Therefore, between the first shared memory block Block1 and the second shared memory block Block2, the second shared memory block Block2 may be selected as a block for performing migration. Further, the migration may be performed only for the valid data stored in the second shared memory block Block2.

Among the plurality of shared memory blocks, when the block having the relatively small valid data is selected as a block for performing migration, a write amplification factor (WAF) can be minimized, and power consumption can be reduced. Whether the block has a relatively small valid data may be determined with respect to a threshold number of valid data.

Although it is described with reference to FIGS. 6A and 6B that one of the plurality of shared memory blocks in the shared memory area 142 is determined as a block for performing migration, the present inventive concepts are not limited thereto. In some example embodiments, more than one of the plurality of shared memory blocks in the shared memory area 142 may be determined as blocks for performing migration. For example, all of the plurality of shared memory blocks in the shared memory area 142 may be determined as blocks for performing migration if all of the plurality of shared memory blocks have a relatively small number of kinds of stream class numbers or a relatively small valid data less than a threshold or reference value. In some other example embodiments, one or more of first and second shared memory blocks included in a shared memory area may be selected (or determined) as one or more blocks for performing migration based on a pattern of data stored in the first and second shared memory blocks, and data stored in the selected one or more of the first and second shared memory blocks may be migrated to a dedicated memory area.

In some example embodiments, migration may be performed by a background operation. For example, when the controller 120 determines that migration is desired, the migration may be performed even in the absence of command from the host 200. Thus, the migration may be performed when the storage device 100 is in an idle state (e.g., while no command is received from the host 200), but the present inventive concepts are not limited thereto.

Referring to FIG. 4 again, when a shared memory block for performing migration is determined from the shared memory area 142, data stored in the corresponding shared memory block is migrated to the dedicated memory area 144 (S450). For example, the migration of data stored in the shared memory area 142 may be performed by the controller 120 of the storage device 100, but the present inventive concepts are not limited thereto. Details of the migration will be described with reference to FIG. 7.

Figure 7:
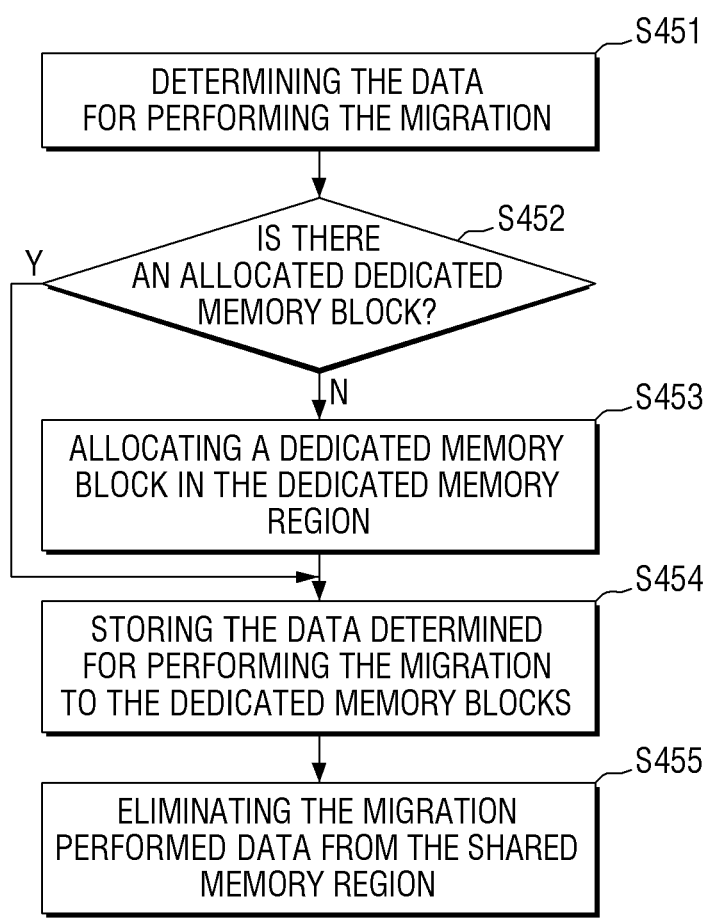
FIG. 7 is a flowchart for explaining a process of migrating data stored in a shared memory area 142 into a dedicated memory area 144 in a data storage device according to an example embodiment.

FIG. 7 is an example flowchart for explaining a process of migrating data stored in a shared memory area 142 into a dedicated memory area 144 in a data storage device according to some embodiments.

Referring to FIG. 7, data to be migrated is determined (S451).

Then, it is determined whether there are dedicated memory blocks for storing the data to be migrated from the shared memory area 142 (S452).

If there are the dedicated memory blocks available for storing the data to be migrated, the data to be migrated is stored in the dedicated memory blocks (S454).

if there is no dedicated memory blocks available for storing the data to be migrated, dedicated memory blocks for storing the data to be migrated are allocated (S453), and the data to be migrated is stored in the allocated dedicated memory blocks (S454).

The migrated data is eliminated from the shared memory area 142, after completing the migration (S455).

Some examples of migration will be described with reference to FIGS. 8A and 8B.

Figure 8A:
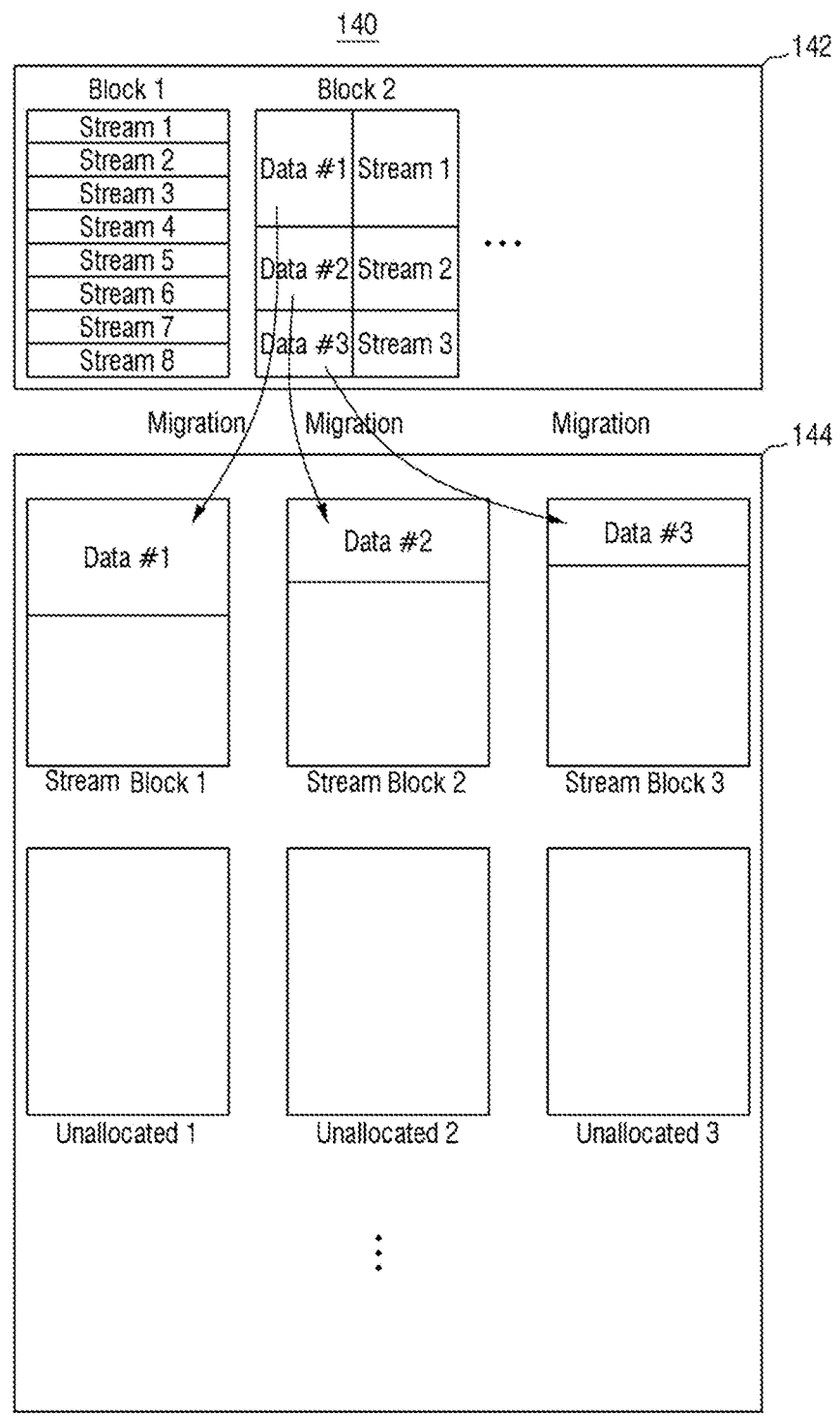
FIGS. 8A and 8B are diagrams for explaining the migration of a shared memory block of a data storage device according to some example embodiments.
Figure 8B:
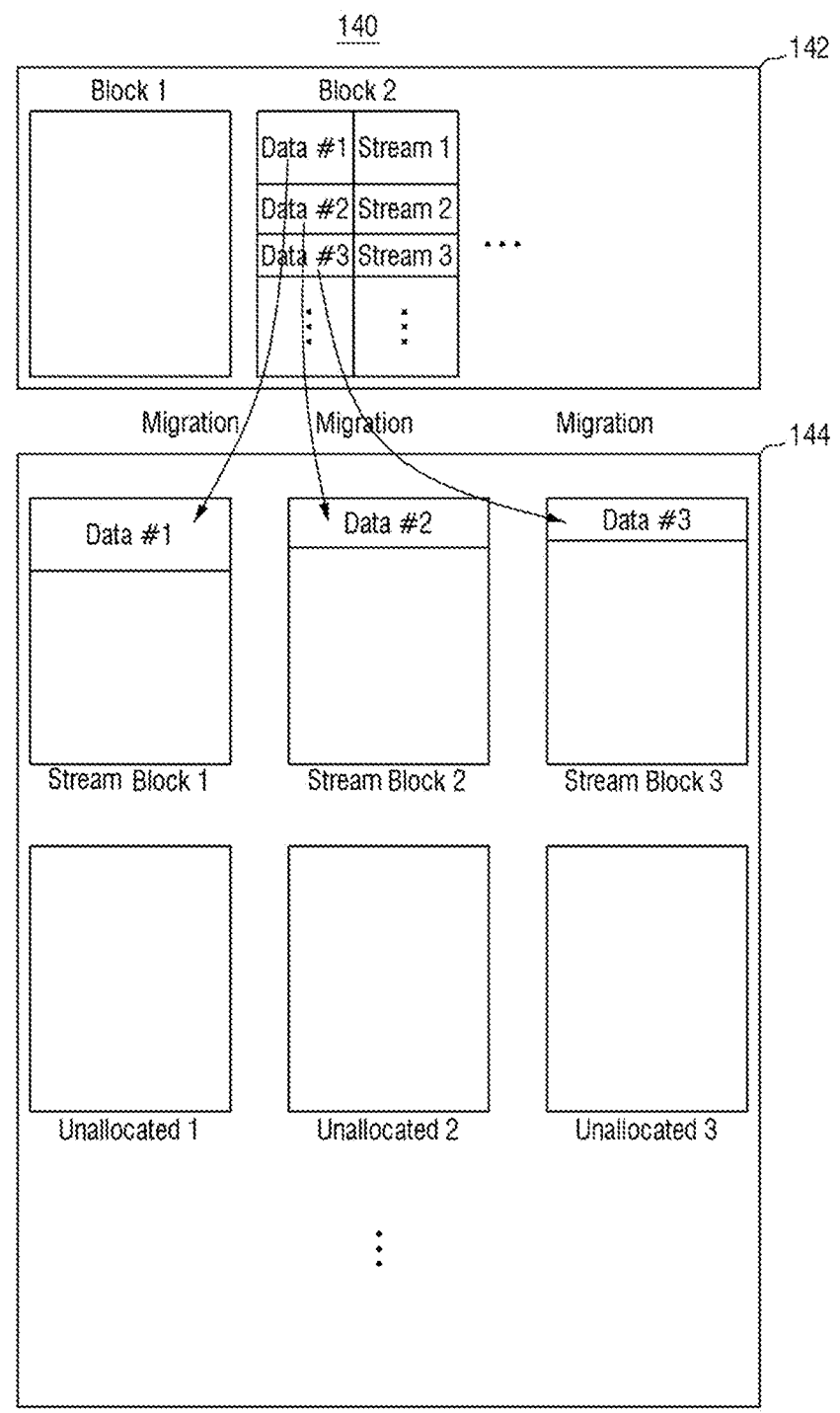

FIGS. 8A and 8B are diagrams for explaining the migration of a shared memory block of a data storage device according to some example embodiments. For convenience of explanation, contents overlapping the aforementioned contents will be omitted or briefly described.

Referring to FIG. 8A, the non-volatile memory 140 of the data storage device 100 may include the shared memory area 142 and the dedicated memory area 144. As described above, the shared memory area 142 may be an area in which data is temporarily stored regardless of the kinds of stream class numbers. The dedicated memory area 144 may be an area in which only data for one stream class number is stored.

Referring to FIG. 8A, the second shared memory block Block2 included in the shared memory area 142 is determined as a block for performing migration. Further, the data stored in the second shared memory block Block2 may include first stream class number Stream1, second stream class number Stream2, and third stream class number Stream3. Although not shown in the drawing, the shared memory area 142 may have unallocated shared memory blocks.

The dedicated memory area 144 may include a plurality of dedicated memory blocks. The dedicated memory area 144 may include unallocated dedicated memory blocks Unallocated1, Unallocated 2, Unallocated 3, . . . .

In the second shared memory block, first data Data #1 to third data Data #3 respectively including first stream class number Stream1 to third stream class number Stream3 may be stored in first dedicated memory block Stream Block1 to third dedicated memory block Stream Block3, respectively. Although it is shown in FIG. 8A that only the first data Data #1 to third data Data #3 are stored in the first dedicated memory block Stream Block1 to third dedicated memory block Stream Block3, respectively, the present inventive concepts are not limited thereto. For example, the first dedicated memory block Stream Block1 to third dedicated memory block Stream Block3 may store first stream class number Stream 1 to third stream class number Stream3, address information, and/or error correction parities in addition to the first data Data #1 to third data Data #3.

Referring to FIG. 8B, in the shared memory area 142, the second shared memory block Block2 is determined as a block for performing migration. Further, it is determined that some of the stream class numbers stored in the second shared memory block Block2 (e.g., first stream class number Stream1 to third stream class number Stream3) are migrated. For example, the first stream class number Stream1 to third stream class number Stream3 may be in order of the number of stream class numbers among the stream class numbers stored in the second shared memory block Block2. For example, the first stream class number Stream1 to third stream class number Stream3 among the stream class numbers stored in the second shared memory block Block2 may be three largest (or relatively large) stream class numbers in the second shared memory block Block2. In FIG. 8B, three stream class numbers (e.g., first stream class number Stream1 to third stream class number Stream3) are selected as some of the stream class numbers of the second shared memory block Block2, the present inventive concepts are not limited to the number of stream class numbers. For example, stream class numbers to be migrated may be the upper eight stream class numbers of the second shared memory block Block2.

Although the above example embodiment explains a case where the data for migration is determined based on the number of stream class numbers stored in the buffer 130, the present inventive concepts are not limited thereto. In some example embodiments, when determining data to be migrated in the second shared memory block Block2, data including stream class numbers previously allocated to the dedicated memory block may be migrated. In some other example embodiments, when determining data to be migrated in the second shared memory block Block2, data including stream class numbers that is most frequently stored in the second shared memory bock Block 2 may be migrated. The determination of data to be migrated may be suitably selected by those skilled in the art.

Although the example embodiment shows that only one shared memory block is subject to data migration, this is for convenience of explanation, and the present inventive concepts are not limited thereto.

In some embodiments, when storing the data stored in the buffer 130 in the non-volatile memory 140, the data is stored in the shared memory area 142 regardless of the stream class number included in each data (e.g., without allocating and distributing blocks in which the data is to be stored), thereby reducing the power consumption and write amplification coefficient of the data storage device 100.

Figure 9:
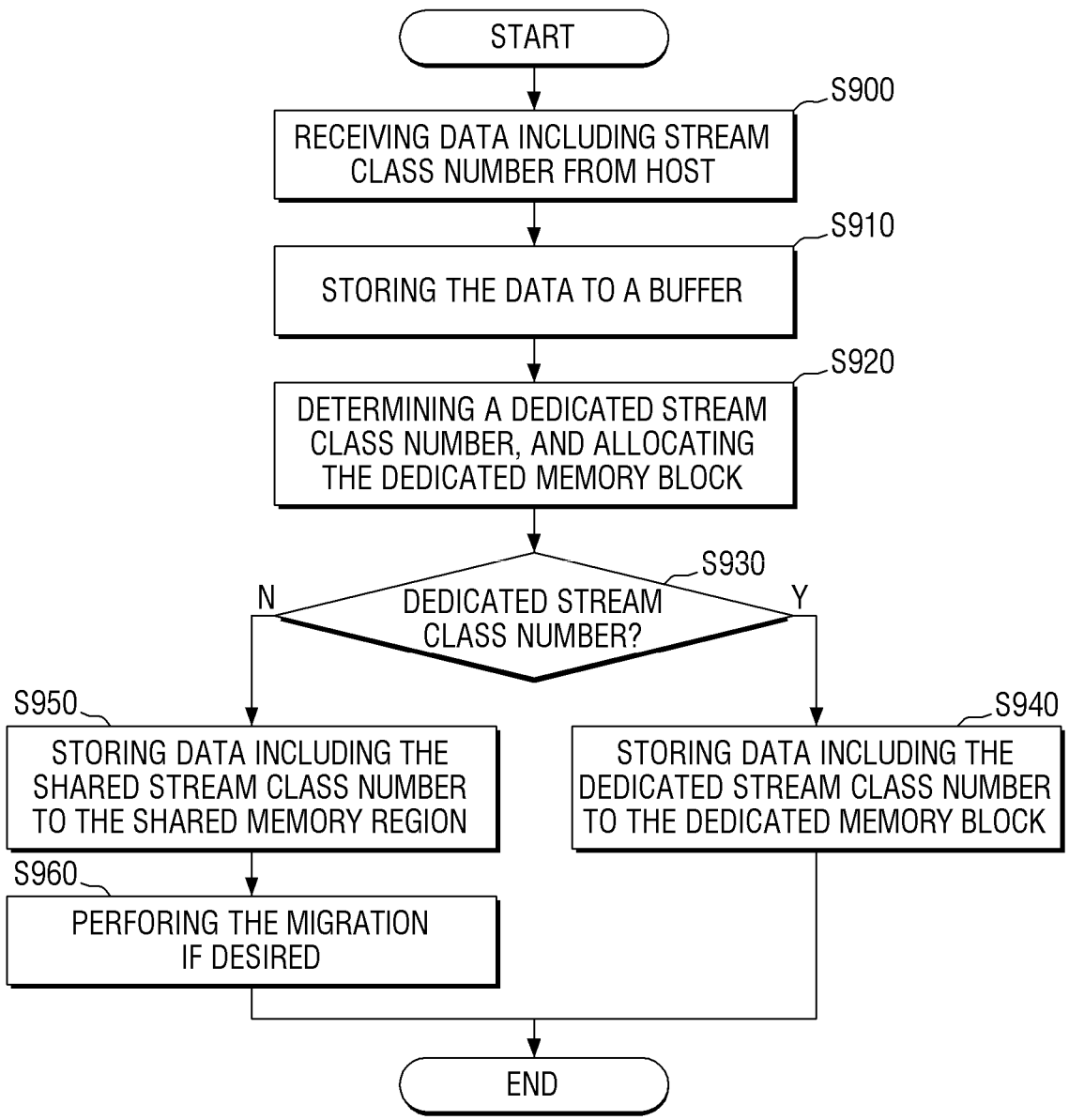
FIG. 9 is a flowchart for explaining the operation of a data storage device according to an example embodiment.

FIG. 9 is an flowchart for explaining the operation of a data storage device according to an example embodiment. For convenience of explanation, contents overlapping the aforementioned contents will be omitted or briefly described.

Referring to FIG. 9, data including stream class numbers is received from the host 200 (S900), and the received data is stored in the buffer 130 (S910).

A dedicated stream class number is determined, and a dedicated memory block (610 of FIG. 11) is allocated (S920). The dedicated memory block (610 of FIG. 11) may be included in the dedicated memory area 144. In some example embodiments, when transferring the data stored in the buffer 130 to the nonvolatile memory 140, the data including the dedicated stream class number may be stored in the dedicated memory area 144, not in the shared memory area 142. A method of determining the dedicated stream class number will be described with reference to FIG. 10.

Figure 10:
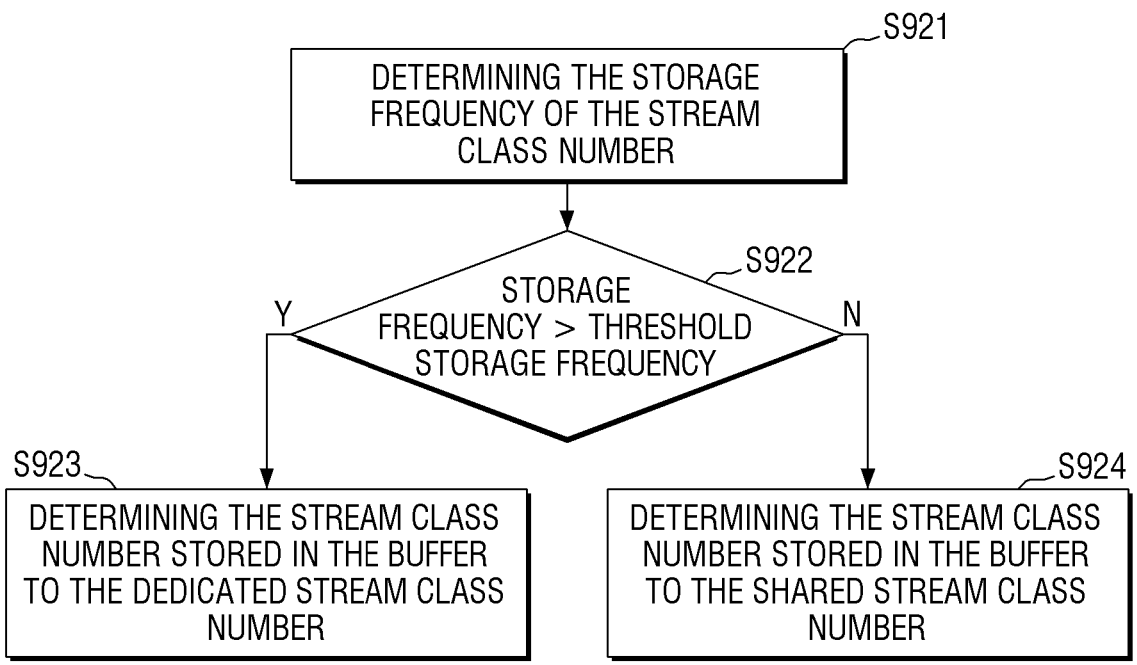
FIG. 10 is a flowchart for explaining a method of determining a dedicated stream class number according to an example embodiment.

FIG. 10 is a flowchart for explaining a method of determining a dedicated stream class number according to an example embodiment.

Referring to FIG. 10, the storage frequency of the stream class number stored in the buffer 130 is determined (S921).

It is determined whether the storage frequency of the stream class number stored in the buffer 130 exceeds a threshold (or alternatively, predetermined) storage frequency (S922).

If the storage frequency of the stream class number stored in the buffer 130 exceeds a threshold storage frequency (e.g., if the stream class number received from the host 200 is received more frequently than a threshold storage frequency), the corresponding stream class number is determined as a dedicated stream class number (S923).

If the storage frequency of the stream class number stored in the buffer 130 is equal to or less than a threshold storage frequency, the corresponding stream class number is determined as a shared stream class number (S923). The shared stream class number may be the same as or similar to the stream class number described with reference to FIGS. 1 to 8B.

If the dedicated stream class number is determined, but the dedicated memory block (610 of FIG. 11) is not allocated, the controller 120 may allocate the dedicated memory block (610 of FIG. 11) to the dedicated memory area 144.

Referring to FIG. 9 again, it is determined whether the stream class number stored in the buffer 130 is a dedicated stream class number (S930).

If the stream class number stored in the buffer 130 is a dedicated stream class number, data including the dedicated stream class number is stored in the dedicated memory area (610 of FIG. 11) (S940).

If the stream class number stored in the buffer 130 is not a dedicated stream class number (e.g., if this stream class number is a shared stream class number), data including the shared stream class number is stored in the shared memory area 142 (S950), and is migrated, if desired (S960). This migration process may be the same as the aforementioned migration process.

That is, when flushing the data stored in the buffer 130 to the nonvolatile memory 140, the data may be stored in the shared memory area 142 of the non-volatile memory 140 or may be stored in the dedicated memory area 144 of the non-volatile memory 140 based on whether the stream class number included in each data is a dedicated stream class number or a shared stream class number. In order to facilitate the understanding of explanation, a description will be made with reference to FIG. 11.

Figure 11:
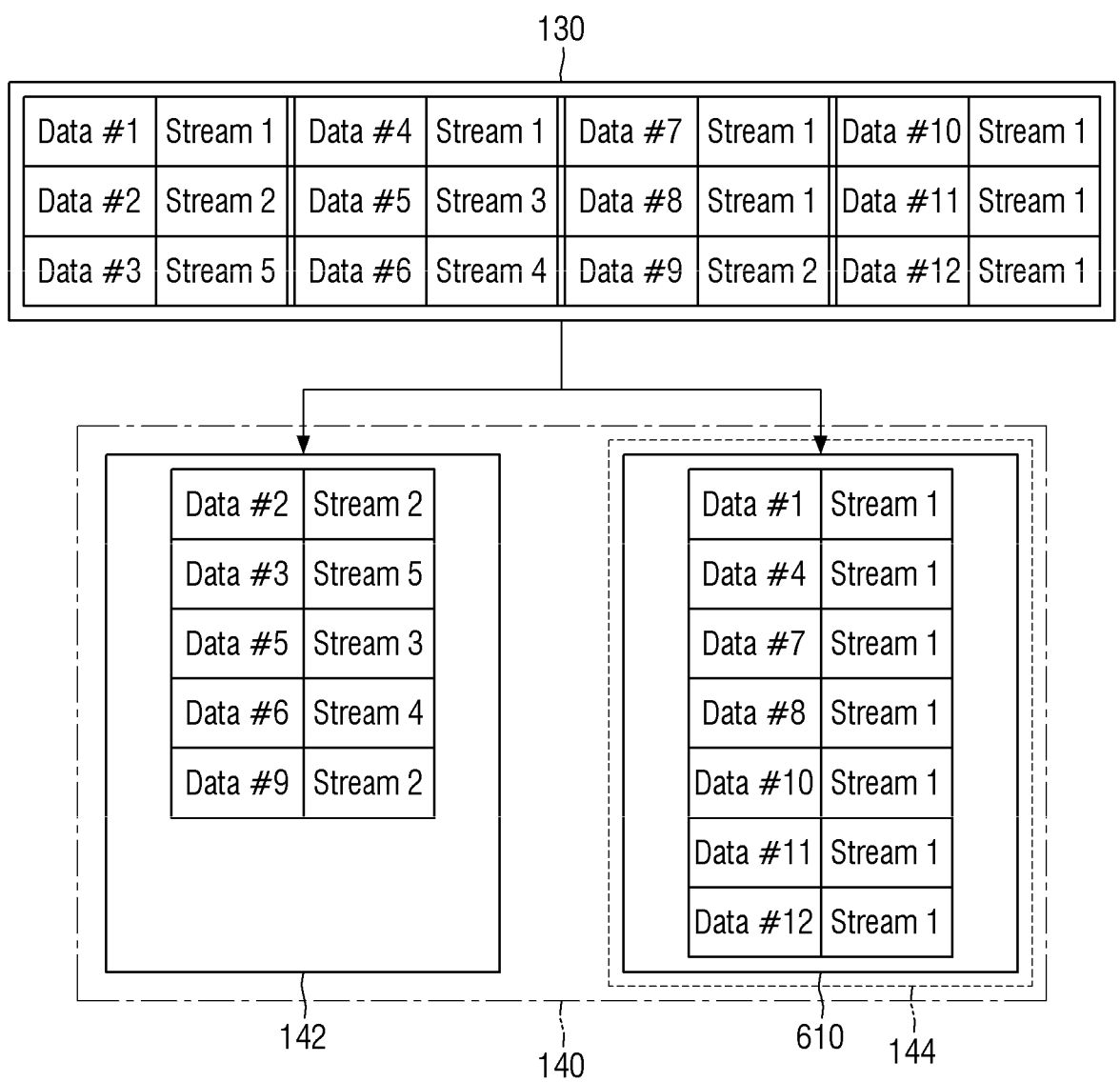
FIG. 11 is a diagram for explaining a method of determining dedicated stream class numbers and distributing and storing data into different areas of a non-volatile memory depending on the kind of stream class numbers according to an example embodiment.

FIG. 11 is an diagram for explaining a method of determining dedicated stream class numbers and distributing and storing data into different areas of a non-volatile memory depending on the kind of stream class numbers according to an example embodiment.

Referring to FIG. 11, data including stream class numbers, received from the host 200, may be stored in the buffer 130. The allocator 122 included in the controller 120 may determine whether to store each data in the shared memory area 142 or the dedicated memory block 610 included in the dedicated memory area 144, based on the stream class numbers of the data stored in the buffer 130.

For convenience of explanation, it is assumed that the threshold storage frequency is 0.5. The data stored in the buffer 130 may include stream class numbers. For example, the data stored in the buffer 130 may include seven first stream class numbers 1 Stream1, two second stream class numbers 2 Stream2, one third stream class number Stream3, one forth stream class number Stream4, and one fifth stream class number Stream5. In this example, the storage frequency of the first stream class numbers 1 Stream1 may be 7/12, and the storage frequency of the second stream class number Stream2 may be 1/6, and the storage frequency of each of the third stream class number Stream3 to the fifth stream class number Stream5 may be 1/12.

Therefore, because the storage frequency of the first stream class numbers 1 Stream1 stored in the buffer 130 exceeds 0.5, the first stream class numbers 1 Stream1 may be determined as dedicated stream class numbers. Thus, the dedicated memory block 610 for the first stream class numbers Stream1, in which only data including the first stream class numbers Stream1 is stored, may be allocated to the dedicated memory area 144. Because the frequency of each of the second stream class number Stream2 to the fifth stream class number Stream5 does not exceed 0.5, the second stream class number Stream2 to the fifth stream class number Stream5 may be determined as shared stream class numbers. The second stream class number Stream2 to the fifth stream class number Stream5 may be stored in the shared memory area 142.

For example, when a flush command is received from the host 200, the controller 120 may transmit the data stored in the buffer 130 to the non-volatile memory 140. In this case, second data Data #2 and third data Data #3, fifth data Data #5 and sixth data Data #6, and ninth data Data #9 may be stored in the shared memory area 142. Further, first data Data #1, fourth data Data #4, seventh data Data #7 and eighth data Data #8, and tenth data Data #10 to twelfth data Data #12 may be stored in the dedicated memory block 610 for the stream class number Stream1.

Figure 12A:
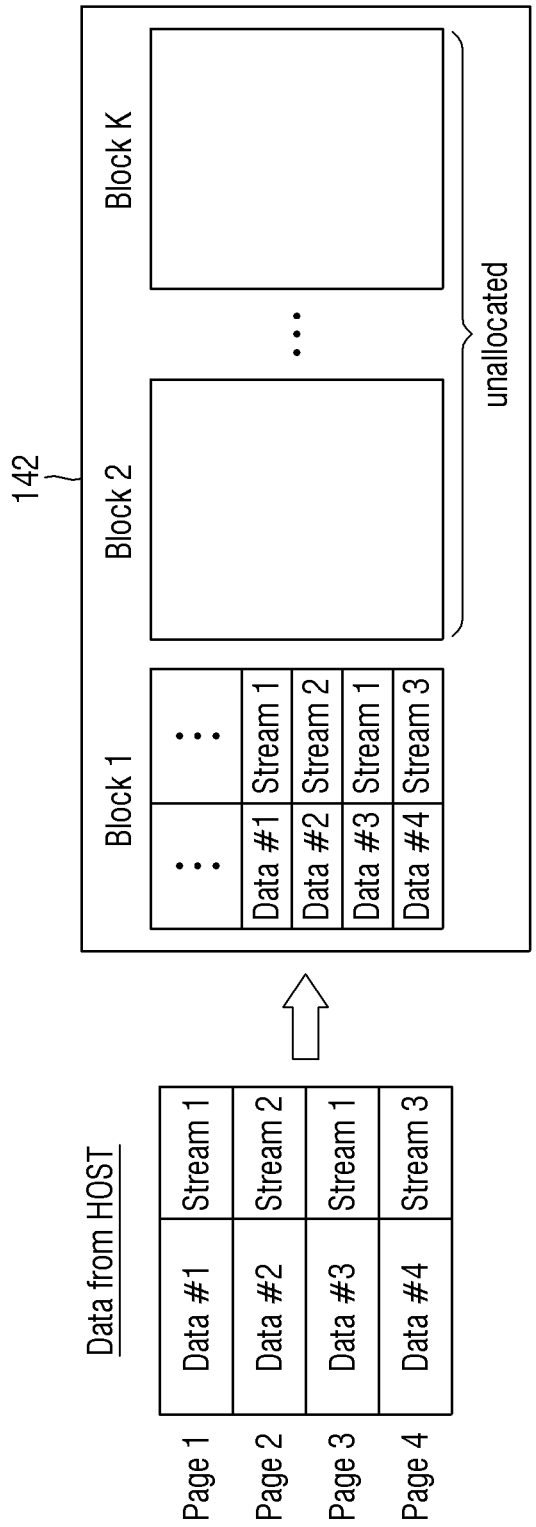
FIGS. 12A and 12B are diagrams for explain a method of storing data in the shared memory block according to some example embodiments.
Figure 12B:
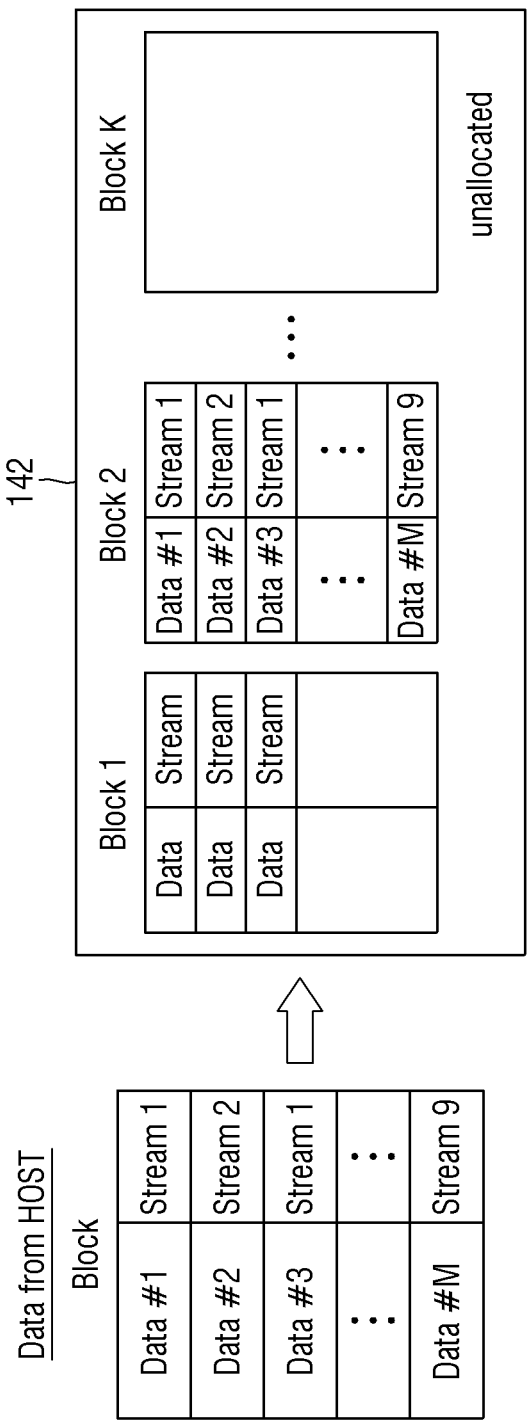

FIGS. 12A and 12B are diagrams for explain a method of storing data in the shared memory block according to some example embodiments.

Referring to FIG. 12A, if data received from the host 200 has a size of a page unit or data stored in the buffer 130 has a size of a page unit, the data may be sequentially stored in a block Block1 having allocated and reserved space. If there is no allocated shared memory block, a new block may be allocated to store the data. If there is no space to store in the shared memory block, as described above, the migration may be performed, the shared memory block having performed the migration may be erased, and data may be stored in the erased shared memory block.

Referring to FIG. 12B, if data received from the host 200 has a size of a block unit or data stored in the buffer 130 has a size of a block unit, a block Block2 not allocated to the shared memory area 142 may be newly allocated, and the data may be stored in the newly allocated block. If there is no space to store in the shared memory block, as described above, the migration may be performed, the shared memory block having undergone the migration may be erased, and data may be stored in the erased shared memory block.

In other words, the data of a page unit may be sequentially stored, and the data of a block unit may be stored in the newly allocated block at once.

Although not shown in the drawings, the data storage device 100 according to the present inventive concepts may be mounted using various types of packages. For example, the data storage device 100 may be mounted using packages such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flat pack (TQFP), system in package (SIP), multi-chip package (MCP), wafer-level fabricated package (WFP), and wafer-level processed stack package (WSP). However, the present inventive concepts are not limited thereto.

Although some example embodiments of the present inventive concepts have been disclosed for illustrative purposes, those skilled in the art will appreciate that various modifications, additions and substitutions are possible, without departing from the scope and spirit of the invention as disclosed in the accompanying claims.

What is claimed is:

1. A data storage device, comprising:
a buffer configured to receive first information and second information and store the first and second information therein, the first information including first data and a first stream class number identifying characteristics of the first data, the second information including second data and a second stream class number identifying characteristics of the second data, the second stream class number being different from the first stream class number;
a non-volatile memory configured to store the first and second data stored in the buffer, the non-volatile memory including a shared memory area and a dedicated memory area, the dedicated memory area being different from the shared memory area, wherein
the shared memory area includes a plurality of shared memory blocks and is configured to store memory data regardless of different data characteristics of respective stream class numbers included therein,
the dedicated memory area includes a plurality of dedicated memory blocks, each of the dedicated memory blocks is configured to store one or more select data, from among the memory data, that have been received from the shared memory area and include a same stream class number, and
at least one of the plurality of shared memory blocks have the first data and the second data; and
a controller configured to control the buffer and the non-volatile memory, the controller further configured to store the first and second data stored in the shared memory area, and then migrate the first data stored in the shared memory area to the dedicated memory area.

2. The data storage device of claim 1, wherein
the buffer is further configured to receive third information, the third information including third data and a third stream class number identifying characteristics of the third data, the third stream class number being different from the first and second stream class numbers, and
the controller is further configured to store the first, second, and third data in the shared memory area.

3. The data storage device of claim 1, wherein the controller is further configured to determine one shared memory block, from among the plurality of shared memory blocks, having a number of valid data less than a threshold number.

4. The data storage device of claim 3, wherein the controller is further configured to migrate the valid data stored in the one shared memory block to the dedicated memory area.

5. The data storage device of claim 1, wherein the controller is further configured to migrate the first data stored in the shared memory area if the first stream class number is a stream class number most frequently stored in the shared memory area.

6. The data storage device of claim 1, wherein
the plurality of shared memory blocks include a first shared memory block and a second shared memory block, and
when storing the first and second data in the shared memory area in a state where the first shared memory block is activated and the second shared memory block is inactivated,
the controller is further configured to store the first and second data in the first shared memory block if each of the first and second data has a size of a page unit, and
the controller is further configured to activate the second shared memory block and store the first and second data in the activated first and second shared memory blocks, respectively, if each of the first and second data has a size of a block unit.

7. The data storage device of claim 6, wherein the controller is further configured to activate the first shared memory block if the first and second shared memory blocks are inactivated, and store the first and second data in the activated first shared memory block regardless of sizes of the first and second data.

8. The data storage device of claim 1, wherein the controller is further configured to migrate the first data using a background operation.

9. The data storage device of claim 1, wherein the controller is further configured to migrate the first data if there is no space to store the first data in the shared memory area.

10. The data storage device of claim 1, wherein the controller is further configured to erase an area in which the first data is stored from the shared memory area after migrating the first data.

11. A data storage device, comprising:
a buffer configured to receive first information, second information, and third information and store the first, second, and third information therein, the first information including first data and a first stream class number identifying characteristics of the first data, the second information including second data and a second stream class number identifying characteristics of the second data, the second stream class number different from the first stream class number, and the third information including third data and a third stream class number identifying characteristics of the third data, the third stream class number being different from the first and second stream class numbers;
a non-volatile memory configured to store the first, second, and third data that have been stored in the buffer, the non-volatile memory including a shared memory area and a dedicated memory area different from the shared memory area; and
a controller configured to control the buffer and the non-volatile memory, the controller further configured to cause the non-volatile memory to,
store the first and second data and the first and second stream class numbers that have been stored in the buffer to the shared memory area, which includes a plurality of shared memory blocks and at least one of the plurality of shared memory blocks have the first data, the second data, and the third data, if a storage frequency of each of the first stream class number and the second stream class number is equal to or less than a threshold storage frequency, and store the third data and the third stream class number stored in the buffer in the dedicated memory area if a storage frequency of the third stream class number is greater than the threshold storage frequency, wherein the shared memory area is configured to store memory data regardless of different data characteristics of respective stream class numbers included therein, and a dedicated memory area includes a plurality of dedicated memory blocks, each of which is configured to store one or more select data, from among the memory data, that have been received from the shared memory area and include a same stream class number.

12. The data storage device of claim 11, wherein the controller is further configured to migrate the memory data stored in the shared memory area to the dedicated memory area.

13. The data storage device of claim 12, wherein
the dedicated memory area includes a first dedicated memory block, a second dedicated memory block, and a third dedicated memory block, the controller is further configured to transfer the third data stored in the buffer to the third dedicated memory block in which only the third data is allowed to be stored when transferring the third data to the dedicated memory area, and the controller is further configured to migrate the first data, from among the data stored in the shared memory area to the first dedicated memory block when migrating the data stored in the shared memory area to the dedicated memory area.

14. The data storage device of claim 12, wherein the controller is further configured to migrate the first data stored in the shared memory area if the first stream class number is a stream class number most frequently stored in the shared memory area.

15. The data storage device of claim 11, wherein
the plurality of shared memory blocks include a first shared memory block and a second shared memory block, and when storing the first and second data in the shared memory area in a state where the first shared memory block is activated and the second shared memory block is inactivated, the controller is further configured to store the first and second data in the first shared memory block if each of the first and second data has a size of a page unit, and the controller is further configured to activate the second shared memory block and store the first and second data in the activated first and second shared memory blocks, respectively if each of the first and second data has a size of block unit.

16. A data storage device, comprising:
a buffer configured to receive first information, second information, and third information, and store the first, second, and third information therein, the first information including first data and a first stream class number identifying characteristics of the first data, the second information including second data and a second stream class number identifying characteristics of the second data, the second stream class number being different from the first stream class number, and the third information including third data and a third stream class number identifying characteristics of the third data, the third stream class number being different from each of the first and second stream class numbers;

a non-volatile memory configured to store the first, second, and third data that have been stored in the buffer, the non-volatile memory including a shared memory area and a first dedicated memory block, the shared memory area including a plurality of shared memory blocks, at least one of the plurality of shared memory blocks having the first data, the second data and the third data, and the first dedicated memory block included in a dedicated memory area and configured to store only the third data that has been received from the shared memory area; and a controller configured to control the buffer and the non-volatile memory, wherein the shared memory area is configured to store memory data regardless of different data characteristics of respective stream class numbers included therein.

17. The data storage device of claim 16, wherein the non-volatile memory further includes a second dedicated memory block in the dedicated memory area, and when there is no space to store the first data in the shared memory area, the controller is configured to migrate the first data to the second dedicated memory block while configuring the second dedicated memory block to store only the first data.

* * * * *